(12) United States Patent
Casari et al.

(10) Patent No.: US 9,308,678 B2
(45) Date of Patent: Apr. 12, 2016

(54) PROCESS FOR THE MANUFACTURE OF SINTERED PRODUCTS

(75) Inventors: Francesco Casari, Smarano (IT); Luca Girardini, Cimego (IT); Mario Zadra, Tres (IT)

(73) Assignee: K4SINT S.R.L., Pergine Valsugana (IT)

( * ) Notice: Subject to any disclaimer, the term of this patent is extended or adjusted under 35 U.S.C. 154(b) by 642 days.

(21) Appl. No.: 13/696,114

(22) PCT Filed: May 10, 2011

(86) PCT No.: PCT/IB2011/000990
§ 371 (c)(1),
(2), (4) Date: Dec. 4, 2012

(87) PCT Pub. No.: WO2011/141796
PCT Pub. Date: Nov. 17, 2011

(65) Prior Publication Data
US 2013/0075953 A1 Mar. 28, 2013

(30) Foreign Application Priority Data
May 14, 2010 (IT) .............................. MO2010A0145

(51) Int. Cl.
*B29C 45/00* (2006.01)
*B22F 3/02* (2006.01)
*B22F 3/22* (2006.01)

(52) U.S. Cl.
CPC ............... *B29C 45/0001* (2013.01); *B22F 3/02* (2013.01); *B22F 3/222* (2013.01)

(58) Field of Classification Search
CPC .......... B29C 45/0001; B22F 3/02; B22F 3/22
USPC ..................... 264/86, 637; 425/84
See application file for complete search history.

(56) References Cited

U.S. PATENT DOCUMENTS 2,962,790 A * 12/1960 Daniel .......................... 264/637
3,041,699 A * 7/1962 Daniel ............................ 425/84

(Continued)

FOREIGN PATENT DOCUMENTS

DE   12 83 730 B   2/1969
EP   0 968 067 B1   1/2000

(Continued)

OTHER PUBLICATIONS

International Search Report, dated Aug. 23, 2011, from corresponding PCT application.

*Primary Examiner* — Joseph S Del Sole
*Assistant Examiner* — Nahida Sultana
(74) *Attorney, Agent, or Firm* — Young & Thompson

(57) ABSTRACT

Process for manufacturing sintered products, includes:
  mixing a sinterable powder material, a liquid carrier and a gelling agent to form a mix, the gelling agent having a gelling temperature below which the mix is substantially rigid and a sol temperature above which the mix is substantially fluid;
  introducing the mix into a forming mould having a filter suitable for passing at least the liquid carrier and trapping at least the sinterable powder material;
  applying a pressure in the mould with the mix having a temperature substantially higher than the gelling temperature and is substantially fluid, the pressure being suitable for allowing the liquid carrier to come out at least partially from the mould through the filter;
  lowering the temperature of the mix in the mould below the gelling temperature to obtain a substantially rigid semi-finished product;
  sintering the semi-finished product to obtain the sintered product.

20 Claims, 3 Drawing Sheets

(56) References Cited

U.S. PATENT DOCUMENTS

| | | | |
|---|---|---|---|
| 4,734,237 A | 3/1988 | Fanelli et al. | |
| 4,937,214 A * | 6/1990 | Morita et al. | 501/127 |
| 5,258,155 A | 11/1993 | Sekido et al. | |
| 5,260,011 A * | 11/1993 | Wolter | B28B 1/0873 264/640 |
| 5,397,520 A | 3/1995 | Rohrbach et al. | |
| 5,770,136 A * | 6/1998 | Huang | B22F 3/15 264/101 |
| 6,262,150 B1 | 7/2001 | Behi et al. | |
| 6,335,065 B1 * | 1/2002 | Steinlage et al. | 428/34.5 |
| 7,517,400 B2 | 4/2009 | Behi | |
| 2002/0175440 A1 | 11/2002 | Bessho et al. | |
| 2005/0113938 A1 * | 5/2005 | Jamiolkowski | A61F 2/02 623/23.74 |
| 2009/0283925 A1 * | 11/2009 | Kuntz et al. | 264/1.21 |
| 2012/0077012 A1 * | 3/2012 | Liu | B29C 67/202 428/221 |
| 2014/0163447 A1 * | 6/2014 | Wieland | A61L 15/28 602/47 |
| 2014/0170350 A1 * | 6/2014 | Sakamoto | B01J 37/036 428/36.5 |

FOREIGN PATENT DOCUMENTS

| | | |
|---|---|---|
| EP | 1 113 893 B1 | 7/2001 |
| JP | 11 179712 A | 7/1999 |

* cited by examiner

Fig. 1
Fig. 2
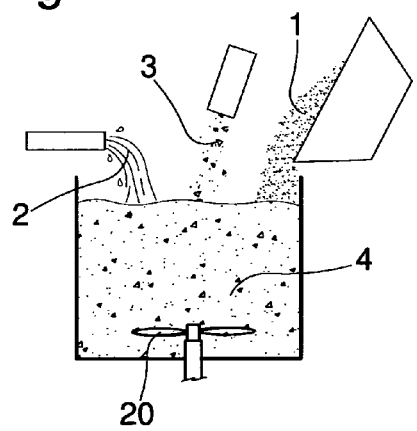
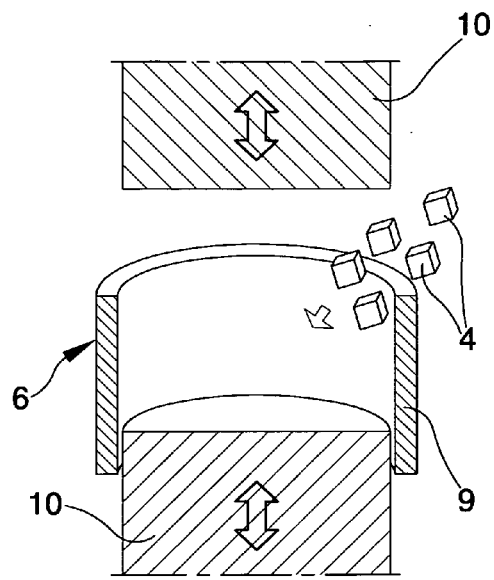
Fig. 3
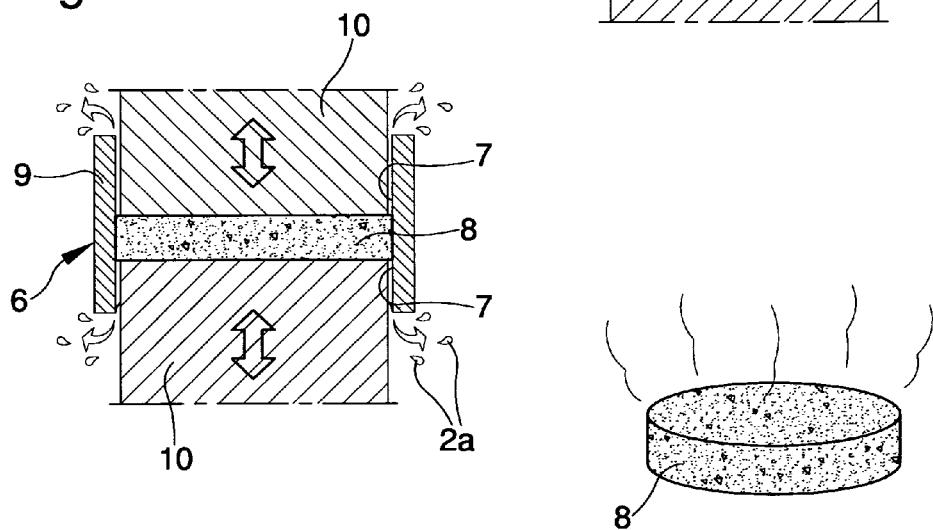
Fig. 4
Fig. 5
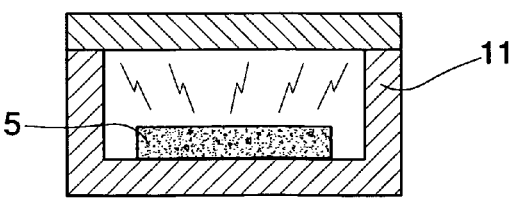

Fig. 6
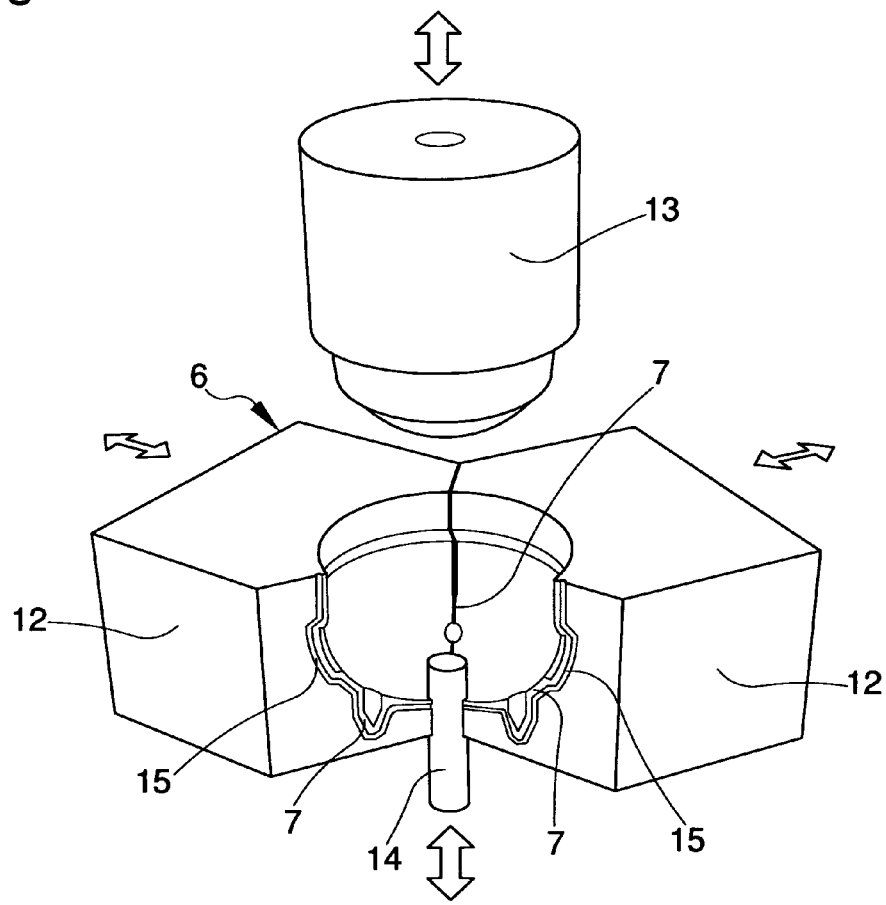
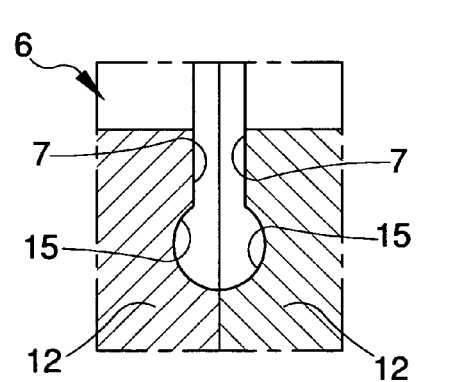
Fig. 7
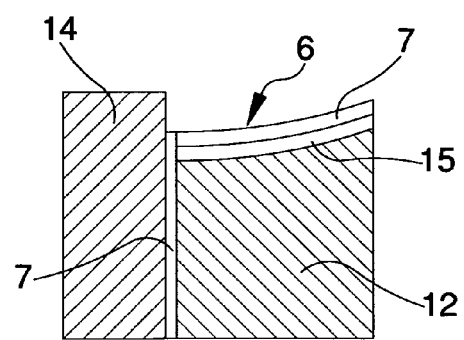
Fig. 8

U.S. Patent   Apr. 12, 2016   Sheet 3 of 3   US 9,308,678 B2
Fig. 9
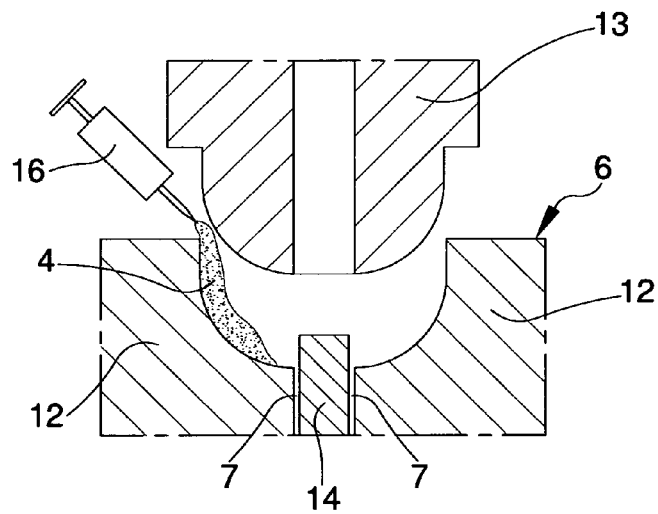
Fig. 10
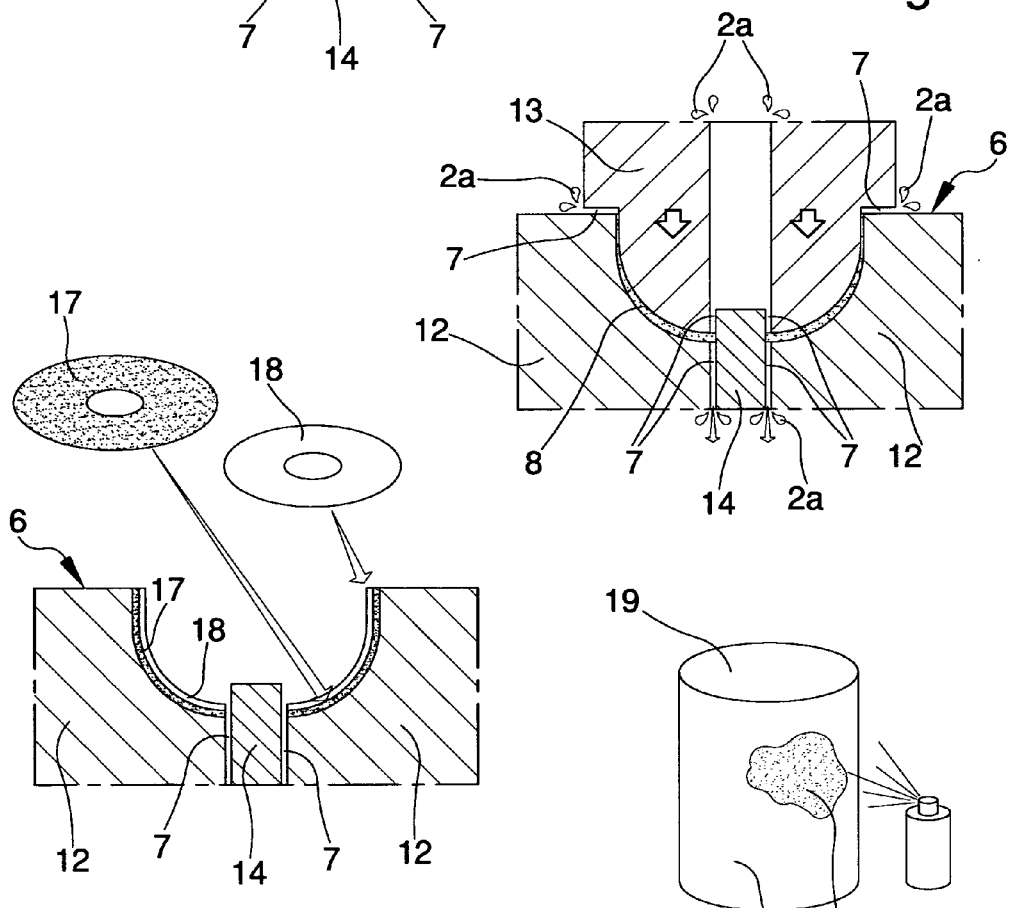
Fig. 11
Fig. 12

PROCESS FOR THE MANUFACTURE OF SINTERED PRODUCTS

TECHNICAL FIELD

The present invention relates to a process for the manufacture of sintered products.

BACKGROUND ART

As known, the "Powder Injection Moulding" (PIM) process is an industrially well-consolidated method used to manufacture small and medium-sized objects, e.g., weighing just a few grams, with complex shapes and which are made in very large batches, e.g., thousands of pieces, starting with sinterable metal or ceramic powders.

Such process envisages diverse phases:
- high-temperature mixing (around 180° C.) of a ceramic or metal powder with a binding substance, conventionally called "binder", which usually consists of a polymer;
- the working of such mix in a granulator at the temperature of about 180° C., to obtain a fluid material ready to be shaped and conventionally called "feedstock";
- pressure injection of the hot feedstock into a cold mould (at around 40° C.);
- removal from the mould of the object shaped this way, conventionally called "green body";
- treatment for the removal of the polymer from the green body, conventionally called "debinding", and obtaining of a semi-finished product called "brown", ready for sintering;
- sintering of the semi-finished product in different atmospheres and at different temperatures depending on the initial type of powder.

The initial types of ceramic or metal powders usually have a size below 100 μm and round morphology so as to ensure good flowability, isotropic shrinkage during sintering and excellent surface finish.

The choice of the binder to be added to the powder depends on different factors: the good tensile strength of the green body is required, as is the excellent fluidity and flowability of the feedstock inside the mould, ease of removal of the polymer and last but not least, it is best to use non-toxic polymers or which do not give off toxic vapours at processing temperatures.

From an industrial viewpoint therefore, various polymers or additives are usually used such as stearic acid, polyethylene, polypropylene, polystyrene, polyvinyl alcohol, oleic acid, paraffins, waxes, poly ethyl glycol, poly methyl butyl acrylate, glycerine, and others still.

The mixing of powder and binder normally occurs using double-screw extruders or blade mixers; the aim is to obtain an intimate contact between the polymers and the metal/ceramic powder without introducing air bubbles.

The mix is then granulated in order to obtain the feedstock ready to be introduced into the extrusion machine hopper, which again heats the material to 180° C. and injects the fluid feedstock into the cold mould.

To ensure the good quality of the green body, it is fundamental not to have air bubbles inside the feedstock injected into the mould, which in turn has special openings to eliminate any air.

The green body thus obtained is removed carefully from the mould and is ready to face the critical states of debinding treatment, the purpose of which is to remove the binder without introducing porosity, cracking, bubbles, or dimensional loss, so as to leave a very unstable skeleton of the ceramic or metal powder.

The semi-finished product obtained after debinding has a minimum mechanical consistency and must be moved with great caution until it is introduced into the sintering furnace, where the actual consolidation of the powder takes place with a linear shrinkage normally between 10% and 20% depending on the volumetric content of ceramic or metal powder in the initial feedstock.

The traditional PIM process does however have a number of drawbacks.

To make a sintered product with good mechanical characteristics and low geometric tolerances, in fact, the semi-finished product obtained after debinding must contain a low amount of residual binder and have a high volumetric powder content.

Depending on the binder used, the debinding treatment adopted in the traditional PIM process can be:
- of the thermal type, wherein the green objects are heated, in air or protected atmosphere depending on the cases, so as to melt, decompose and then evaporate the binder. This, inconveniently, must be done in a very controlled way, to prevent the formation of defects such as cracks, bubbles and/or breakages of the moulded product due to the different behaviours of the ingredients introduced to form the binder. The process normally requires a few hours and, for ceramic parts with thickness of a few centimeters, even a few days;
- of the catalytic type, wherein the binder is polyacetal based and is decomposed catalytically using gaseous nitric acid and/or oxalic acid. This process cuts the debinding times and creates less problems as regards bubbles or breakages compared to the previous one but, nevertheless, it has a negative environmental impact and involves high plant costs;
- of a chemical type, wherein acetone, hexane and/or toluene are used as solvents, to remove the binder chemically. This is a very effective but hard to use method due to problems involving the environment and the toxicity of the solvents;
- of a chemical-physical type, where the means of removal consists in supercritical carbon dioxide at high pressure and temperature, which is in an intermediate state between gaseous and liquid, and is therefore distinguished by low viscosity, thereby minimising treatment time. This method too however has far from negligible costs.

Besides the above drawbacks tied to the type of debinding used, it should be underlined that the traditional PIM process does not allow obtaining metal or ceramic objects with considerable wall thickness inasmuch as the debinding cycle required to prevent the formation of bubbles and/or cracks would be so long as to make the process uneconomical and in any case critical.

To overcome the problems associated with the debinding treatment and obtain complex products with good mechanical characteristics, it is possible to follow the teachings contained in the U.S. Pat. No. 4,734,237.

This document describes a PIM process that uses water and gelling agent, usually, but not only, a hydrocolloid, to obtain the binder to be added to the ceramic and/or metal powder.

The water works as a solvent while the gelling agent has the property of forming a gel when it is cooled from a temperature of 80° C. to room temperature.

The feedstock is then prepared at temperatures of 80-90° C. mixing the ceramic/metal powder with water, hydrocolloids, dispersing and plasticizing agents to form a mix of treacly consistency.

The feedstock obtained this way is kept at a temperature such as to cause part of the water considered in excess to evaporate and is then introduced into an extruder and injected into the cold mould.

After removal from the mould, the green body thus obtained undergoes a simple drying process and is ready to be sintered.

Further changes are then suggested in the U.S. Pat. Nos. 5,258,155, 5,397,520, EP 0 968 067, EP 1 113 893, U.S. Pat. Nos. 6,262,150, 7,517,400.

Nevertheless, despite the improvements made with the different patents and the practical innovations made in the industrial field, a number of drawbacks still remain that make the PIM process with water-based binder little used.

In particular, the fact is underlined that the tensile strength of the green body obtained by means of water-based binder is much lower compared to a polymer binder, which makes the removal phase from the mould critical and does not allow faithfully maintaining the geometric shape given by the mould.

Furthermore, the capacity of the water-based feedstock to run inside the mould is rather low because, to obtain less linear shrinkage during sintering and, therefore, have fewer distortions, the feedstock must have a high content of metal/ceramic powder rather than water.

To overcome the low feedstock fluidity, plasticizing agents or high hydrocolloid contents are sometimes used which inconveniently prevent the possibility of performing the debinding by means of simple drying.

It should not be forgotten in fact that the water content in the feedstock must inconveniently remain constant during the entire moulding phase to prevent any change in the rheological characteristics of the feedstock and therefore in the mould filling capacity.

To this must be added the fact that the majority of hydrocolloids requires the presence of Na+, Mg2+ or K+ ions to carry out its functions, but such elements are undesired in the finished product due to problems of corrosion as regards the metals and drop in dielectric strength in the ceramics.

All these problems strongly restrict the use of the PIM process with water-based binder, above all as regards low productivity.

DESCRIPTION OF THE INVENTION

The main aim of this invention is to provide a process for the manufacture of sintered products which is at the same time practical, easy and functional, has a low environmental impact and also allows obtaining metal and/or ceramic objects with considerable wall thickness without incurring in particularly critical phases or in problems associated with the corrosion of metals and drop in dielectric strength of ceramics.

Another object of the present invention is to provide a process for the manufacture of sintered products that allows overcoming the mentioned drawbacks of the background art within the ambit of a simple, rational, easy to use and low cost solution.

The above mentioned objects are achieved by the present process for the manufacture of sintered products, comprising the steps of:
mixing a sinterable powder material, a liquid carrier and at least a gelling agent to form a mix for the manufacture of a sintered product, said gelling agent having a gelling temperature below which said mix is substantially rigid and a sol temperature above which said mix is substantially fluid;
introducing said mix into a forming mould having filtering means suitable for being crossed at least by said liquid carrier and trapping at least said sinterable powder material;
applying a pressure in said forming mould with said mix which has a temperature substantially higher than said gelling temperature and is substantially fluid, said applying a pressure being suitable for allowing said liquid carrier to come out at least partially from said forming mould through said filtering means;
lowering the temperature of said mix in said forming mould below said gelling temperature to obtain a substantially rigid semi-finished product;
sintering said semi-finished product to obtain said sintered product.

BRIEF DESCRIPTION OF THE DRAWINGS

Other characteristics and advantages of the present invention will become more evident from the description of a preferred, but not exclusive, embodiment of a process for the manufacture of sintered products, illustrated by way of example, but not limited to them, in the annexed drawings in which:

FIGS. 1 to 5 show, in a sequence of schematic and partial views, a particular embodiment of the process according to the invention;

FIGS. 6 to 10 show, in a sequence of schematic and partial views, an alternative embodiment of the process according to the invention;

FIG. 11 is a section, schematic and partial view which illustrates a possible variation of the process according to the invention;

FIG. 12 is a section, schematic and partial view which illustrates another possible variation of the process according to the invention.

EMBODIMENTS OF THE INVENTION

The process according to the invention comprises a first step which consists in mixing a sinterable powder material 1, a liquid carrier 2 and at least a gelling agent 3 to form a mix 4 for the manufacture of a sintered product 5.

The sinterable powder material 1 is of the metal type, e.g., steels, stainless steels, titanium alloys, copper, metal matrix composites (MMC), WC/Co alloys, including mixed the one with the other or arranged in suitably determined spatial sequences, or of the ceramic type, e.g., alumina, zirconium, or again metal/ceramic mixes.

The grain size of the powders may differ according to the type of material and its intended use; similarly, the powders can have different shapes, both a substantially compact shape, e.g., suitably spherical, and an elongated shape, e.g., to define a fibre or the like.

The liquid carrier 2 is preferably water, but alternative embodiments cannot be ruled out wherein in its place an alcohol or in general another liquid is used able to produce the same behaviour described in this process.

The gelling agent 3 is typically a hydrocolloid substance and is selected from the list comprising: agar-agar, carrageenan, pectin, animal gelatines, isinglass, alginates, agarose, xanthan gum, caribe seed flour, acacia, cellulose gum.

In any case, the gelling agent 3 is such as to have a gelling temperature, below which the mix 4 is substantially rigid, and a sol temperature, above which the mix 4 is substantially fluid, the mix 4 conserving, between the gelling temperature and the sol temperature, its own state and its own previously-acquired characteristics of rigidity and/or of fluidity.

In other words, below the gelling temperature (about 30° C. for agar-agar and carrageenan), the gelling agent 3 binds the molecules of water 2 in which it is dispersed and makes the mix 4 so viscous as to be able to consider it substantially solid to all effects (gelling).

Above the sol temperature (about 75° C. for agar-agar and carrageenan), on the other hand, the gelling agent 3 unrolls and spreads and the mix 4 acquires great fluidity.

Between the gelling temperature and the sol temperature, on the other hand, the gelling agent 3 does not change the previously-acquired state; consequently, a mix 4 with temperature below the gelling temperature continues to remain rigid even if its temperature exceeds the gelling temperature and only becomes fluid when it exceeds the sol temperature, while a mix 4 with temperature above the sol temperature remains fluid even if its temperature drops below the sol temperature and only becomes rigid below the gelling temperature.

For some particular types of hydrocolloids such hysteresis cycle can only occur once, while the most commonly used hydrocolloids, such as carrageenan and agar-agar, maintain their characteristics indefinitely whatever the number of heating and cooling cycles: depending on use, a choice can be made between reversible and non-reversible systems.

The mixing phase can be carried out at a temperature above the sol temperature, so as to immediately obtain a well-amalgamated fluid mix 4.

Alternatively, the sinterable powder material 1, the liquid carrier 2 and the gelling agent 3 can be mixed beforehand at a temperature below the sol temperature and then the mix 4 can be raised above such sol temperature only subsequently so as to obtain a fluid mix 4 only when necessary.

Once the fluid mix 4 has been obtained, this can if necessary be allowed to cool inside specific templates at a temperature below the gelling temperature so as to obtain a rigid mix 4 shaped in pellets, in cubes, in disks, in rings, in sheets or in any other shape might be useful for the subsequent process phases.

In the event of stainless steel being taken into consideration as sinterable powder material, during the mixing phase, the sinterable powder material 1, the liquid carrier 2 and the gelling agent 3 are mixed in the following weight concentrations assessed on the total weight of the mix 4:

| | |
|---|---|
| sinterable powder material | 80% ÷ 90% |
| liquid carrier | 10% ÷ 20% |
| gelling agent | 0.1% ÷ 0.6% |

In this respect, it must be underlined that the high water content in the mix 4 so obtained allows giving it great fluidity and flowability, which will prove to be very favourable in the subsequent process phases.

It must however be emphasised that the content of water and of gelling agent, according to the doses just indicated does not appear necessary or exclusive: in fact, depending on the density of the sinterable powder material 1, such percentages can vary considerably.

What is necessary is that the mix of liquid carrier 2 and gelling agent 3 only produce the formation of a gel with strength of at least 200 g/cm².

The possibility of introducing one or more additional components into the mix 4 cannot, furthermore, be ruled out. These can be selected from the list comprising: hardeners, fluidizers, surfactants, corrosion inhibitors, fungicides, bactericides, and spacers, meaning by spacers any system able to produce voids or cavities when removed (polyethylene, polymethylmethacrylate, polystyrene).

The next phase of the process according to the invention comprises the introduction of the mix 4 into a forming mould 6 suitable for giving the mix 4 the shape of the product to be obtained.

In this phase, the mix 4 can be introduced into the forming mould 6 both in fluid state and in rigid state.

In particular, in the first case, the temperature of the mix 4 is substantially higher than the sol temperature, or also between the gelling temperature and the sol temperature, as long as, however, the mix 4 already starts from the fluid state.

In the second case, on the other hand, the temperature of the mix 4 is substantially lower than the gelling temperature, or also between the gelling temperature and the sol temperature, as long as, however, the mix 4 already starts from the rigid state.

In this second case, e.g., the mix 4 can be moulded in a shape selected from the list comprising pellets, cubes, disks, rings, sheets, so as to exploit their conformation to distribute the rigid mix 4 in preset spatial sequences inside the forming mould 6, e.g., on one or more separate layers superimposed along the walls of the forming mould 6.

In the event of the mix 4 being introduced into the forming mould 6 in rigid state, then the process according to the invention envisages an additional heating phase of the forming mould 6 to bring the mix 4 to a temperature higher than the sol temperature and cause it to pass to the fluid state, so as to allow the complete filling of the forming mould 6.

For this purpose, the forming mould 6 has a heating and a cooling system to change the temperature of the mix 4; for example, inside the forming mould 6, transit ducts are obtained for a heating or cooling fluid.

Furthermore, the forming mould 6 has filtering means 7 suitable for being crossed by at least the liquid carrier 2 and for trapping at least the sinterable powder material 1 present in the mix 4.

In the event of the sinterable powder material 1 consisting of a metal powder, the size of which is usually below 45 µm, then the filtering means 7 can usefully consist of one or more slits obtained in the forming mould 6 and with substantially smaller dimensions than the average dimensions of the particles of sinterable powder material 1; for example, the thickness of the slit 7 is substantially smaller than 50 µm, preferably 10 µm.

In the event, instead, of the sinterable powder material 1 consisting of a ceramic powder, the dimensions of which are usually much below those of metal powders, the filtering means 7 can consist of an insert arranged inside the forming mould 6 and made of a porous material, e.g., plaster, resin or sintered metal filters.

Once the mix 4 has been introduced, the process according to the invention envisages a phase of application of a pressure in the forming mould 6, with the mix 4 having a temperature substantially higher than the gelling temperature and being substantially fluid, the application of the pressure being suitable to allow the at least partial outflow of the liquid carrier 2 from the forming mould 6 through the filtering means 7.

Usefully, the pressure applied on the mix 4 inside the forming mould 6 is substantially higher than 2 MPa and, e.g., is equal to 40 MPa.

Usually, the outflow of the liquid carrier 2 is also accompanied by the outflow of a part of the gelling agent 3 dissolved in the liquid carrier 3 and, therefore, during this phase, it is more correct to say that, through the filtering means 7, a liquid carrier/gelling agent mix 2a comes out.

Usefully, the outflow of the liquid carrier/gelling agent mix 2a through the filtering means 7 is also accompanied by the elimination of any gas and/or air bubbles, thus avoiding any inconvenient subsequent degassing operations.

Once the liquid carrier/gelling agent mix 2a in excess has come out, the process according to the invention involves a phase of temperature lowering of the mix 4 in the forming mould 6 below the gelling temperature in order to obtain a substantially rigid semi-finished product 8.

This phase can be easily carried out by cooling the forming mould 6 by means of the above heating and cooling system which, if suitably designed, is able to allow freezing the mix 4 below 0° C.

In this respect, it must be underlined that the high volumetric powder content prevents the ice from forming crystals of a size such as to fracture the semi-finished product 8; furthermore, although the hydrocolloid substances 3 generally suffer from syneresis (water expulsion during freezing) this problem does not affect the maintaining of the shape and the tensile strength of the semi-finished product 8 once it has been unfrozen.

The possibility of freezing the mix 4 below 0° C., on the other hand, allows having a semi-finished product 8 of a consistency such as to easily undergo mechanical removal operations using traditional tools.

Even when not frozen, however, the semi-finished product 8 has enough tensile strength to allow it to be easily taken out of the mould and conveniently handled by virtue of the fact that part of the excess water 2 initially present inside the mix 4 has been removed under pressure.

The next step of the present process involves a phase of drying of the semi-finished product 8 which allows the removal of almost all the residual water 2 before its final sintering.

The drying of the semi-finished product 8 can consist in leaving the semi-finished product 8 in the open air, drying occurring by natural evaporation or, to speed up the process, in placing it in a controlled-evaporation system, e.g., a climatic chamber, or, in the case of the semi-finished product 8 having been frozen, in a dryer under vacuum able to sublime the ice.

The last step of the present invention consists in sintering the semi-finished product 8 obtained in this way in order to obtain the required sintered product 5.

EXAMPLE 1

With reference to the embodiment schematically illustrated in the figures from 1 to 5, the mix 4 was obtained with the following ingredients: 100 g of sinterable powder material 1 (powder Ti6Al4V) with particle size below 45 μm, 17 g of liquid carrier 2 (distilled water) and 0.34 g of hydrocolloid substance 3 in powder (Genugel®, carrageenan based).

The mix 4 was brought to 85° C. and mixed for a few minutes to amalgamate it all in fluid state (FIG. 1), and subsequently it was left to cool to 20° C., thereby allowing gelling.

The rigid mix 4 was then cut into small cubes which were introduced into the forming mould 6 (FIG. 2).

The forming mould 6 is made up of a cylinder 9 with an inner diameter of 40 mm and a height of 40 mm and two punches 10 with diameter 40 mm and height 40 mm, with tolerance compared to the cylinder 9 of 10 μm, so as to define the slots 7 of the filtering means 7.

The forming mould 6 was then heated to 85° C. before waiting for the cubes of the mix 4 to return to the fluid state.

Subsequently, a 5 t load was applied to the punches 10 so as to create an inner pressure of 40 MPa which was enough to cause the excess water/hydrocolloid mix 2a to come out through the clearance defined between the punches 10 and the cylinder 9 (FIG. 3).

After a few minutes, the outflow of the water/hydrocolloid mix 2a stopped and the mix 4 was cooled below the gelling temperature before taking the semi-finished product 8 thus obtained out of the forming mould 6.

The quantity of water/hydrocolloid mix 2a which came out during the pressure application phase was around 5 g and, taking into account the fact that there is no trace of powder inside, it can be deducted that the semi-finished product 8 taken out of the forming mould 6 is composed of 100 g of Ti6Al4V, 12.1 g of distilled water and 0.247 g of Genugel®.

The semi-finished product 8 was then left to dry in the open air at room temperature for 2 days (FIG. 4) and a further 11 g weight loss occurred; at the end of this cycle, the semi-finished product 8 was therefore composed of 100 g of Ti6Al4V, 1.1 g of distilled water and 0.247 g of Genugel®.

The dried semi-finished product 8 was then sintered in a vacuum furnace with metal chamber 11 (FIG. 5) at a temperature of 1260° C. for 1 h with a vacuum level of $1 \cdot 10^{-5}$ mbar.

The temperature rising (ramp up) times were the following:
from room temperature up to 110° C. at a speed of 50° C./h;
stasis at 110° C. for 2 h;
rise to 240° C. at a speed of 50° C./h;
stasis at 240° C. for 2 h;
rise to 1260° C. at a top speed of 60° C./h;
stasis at 1260° C. for 1 h;
forced cooling.

Metallographic and microstructural analyses carried out on the sintered product 5 produced the following results:
Linear Shrinkage [%]: 13.3
Relative Density [%]: 99.0
Carbon Content [% wt.]: 0.06
Oxygen Content [% wt.]: 0.19
Hardness [HV 10]: 330

EXAMPLE 2

With reference to the embodiment of the invention shown in the figures from 6 to 10, the forming mould 6 was made shown schematically in the FIGS. 6, 7 and 8 for the fabrication of an acetabular cup with maximum diameter 46 mm, height 29 mm and volume 12.813 cm³.

The forming mould 6 is composed of three 120° sectors 12 lying on the same horizontal plane (in FIG. 6 only two sectors 12 are shown for greater clarity of representation), a punch 13 and a pin 14.

The three sectors 12 can move on the horizontal plane according to the directions indicated in FIG. 6, just as the punch 13 and the pin 14 can move in vertical direction.

When all three sectors 12, the punch 13 and the pin 14 are suitably positioned, the shape is defined of the acetabular cup to be obtained.

The pin 14 and the three sectors 12 are fitted with a clearance of about 10 μm which defines a first slot 7 for the expulsion of the water/hydrocolloid mix 2a.

Similarly, the punch 13 is ready to be coupled with the pin 14 and with the three sectors 12, leaving a very slight clearance which defines the second slots 7 for the expulsion of the water/hydrocolloid mix 2a.

Furthermore, each sector 12 has an inner channel 15 which emerges on the surface of the forming mould 6 through a third slot 7 with thickness of about 5 μm which, once coupled with a corresponding third slot 7 of an adjacent sector 12, forms an opening which altogether is 10 μm thick (FIG. 7).

Through the third slots 7, the excess water/hydrocolloid mix 2a can flow in the inner channels 15 and come out of the forming mould 6.

Each part of the forming mould 6 just shown, furthermore, contains inside it a heating and cooling system.

In order to make an acetabular cup of the above dimensions, the forming mould 6 has been linearly enlarged by 13.3% taking into account the linear shrinkage obtained from the previous example, and the mix 4 has been obtained with the following ingredients: 56.6 g of sinterable powder material 1 (powder Ti6Al4V), 9.6 g of liquid carrier 2 (distilled water) and 0.193 g of hydrocolloid substance 3 (Genugel®).

After having kept the mix 4 at a temperature of 85° C. and having mixed it for a few minutes, it was introduced into a syringe 16 and kept at a temperature of 60° C. to prevent gelling.

The forming mould 6 with the three sectors 12 closed and with the pin 14 fitted as shown in the FIG. 6, was brought to a temperature of 60° C. and the mix 4 contained in the syringe 16 was allowed to flow inside the concave volume (FIG. 9).

The punch 13 was lowered until the required pressure was applied for a time of about 10 s, which caused the excess water/hydrocolloid mix 2a to come out (FIG. 10).

The temperature of the forming mould 6 was then lowered to 20° C. to allow gelling and the forming mould 6 was opened to remove the rigid semi-finished product 8 which was left to dry for two days in the open air.

After the drying phase, considering the different water/hydrocolloid mix 2a losses during moulding and water 2 loss during drying, the semi-finished product 8 was composed of 56.6 g of powder Ti6Al4V, 0.57 g of water 2 and 0.11 g of Genugel®.

Using the sintering cycle of the example 1 the desired object was obtained with a relative density of 98.9%.

EXAMPLE 3

The decision was taken to make the object of the example 2 in stainless steel 17-4 PH with the variation of a polar hole to be made by machining the semi-finished product 8.

A mix 4 was made using the following ingredients: 100 g of sinterable powder material 1 (powder 80%-22 μm—Sandvik Osprey), 12 g of liquid carrier 2 (distilled water) and 0.36 g of hydrocolloid substance 3 (Genugel®).

The mix 4 was brought to 80° C. and mixed for a few minutes, allowed to cool at room temperature and cut into cubes.

The forming mould 6 of the example 2 was heated to 85° C., the mix cubes 4 were placed inside it to wait for the switch to fluid state and then, the required pressure was applied to enable the excess water/hydrocolloid mix 2a to come out.

After waiting a few seconds, the temperature of the forming mould 6 was lowered to −20° C. keeping the pressure applied: at the end of freezing, the semi-finished product 8 was taken out and showed excellent rigidity, such as to easily allow the polar drilling operation.

Immediately afterwards, and the object still being frozen, it was decided to sublime the ice by means of vacuum.

After 12 hours of treatment in a dryer under vacuum, the semi-finished product 8 was positioned in a vacuum furnace with graphite heating chamber and the following heat cycle was set:

- from room temperature up to 110° C. at the speed of 50° C./h;
- stasis at 110° C. for 2 h;
- rise to 270° C. at the speed of 50° C./h;
- stasis at 270° C. for 2 h;
- rise to 1050° C. at the top speed of 60° C./h in partial Ar/H2 atmosphere;
- stasis at 1050° C. for 1 h in partial Ar/H2 atmosphere;
- rise to 1350° C. at the speed of 100° C./h in partial Ar/H2 atmosphere;
- stasis at 1350° C. for 1 h in partial Ar/H2 atmosphere;
- forced cooling.

At the end of the sintering treatment, the object had a relative density of 99.3%, and a carbon content of 0.07% wt.

EXAMPLE 4

The decision was taken to make the acetabular cup of the example 2 with a porous outer structure in zirconium and the internal part in alumina.

For the outer part, initially required with a porosity of 60% vol., the following components were mixed: 22.96 g of sinterable powder material (Mg—ZrO2), 4 g of liquid carrier (distilled water), 0.12 g of hydrocolloid substance (Genugel®), and 5.64 g of polyethylene balls of size between 300 and 400 μm, with spacer function.

The mix 4 was heated to 85° C., mixed for a few minutes and cooled below the gelling temperature in several moulds to produce a number of rings 17 with outer diameter of around 70 mm and internal diameter of around 10 mm with thickness around one millimeter.

For the internal part, the following ingredients were mixed: 38.37 g of sinterable powder material (alumina), 9.5 g of liquid carrier (distilled water) and 0.285 g of hydrocolloid substance (Genugel®).

This mix 4 was also heated to 85° C., mixed for a few minutes and cooled below the gelling temperature in several moulds to produce a number of rings 18 with outer diameter of around 65 mm and internal diameter of around 10 mm with thickness around one millimeter.

The undried rings 17, 18 were still considerably flexible and were easily positioned in the forming mould 6 being careful to place the zirconium rings near the bottom (FIG. 11).

At this point, the punch 13 was lowered in order to make an almost final shape and the temperature of the mould was increased to 85° C. to bring the rings 17, 18 to the fluid state.

Afterwards, the load was increased until a pressure was applied that made it possible for the excess water/hydrocolloid mix 2a to come out.

The forming mould 6 was then cooled, the semi-finished product 8 was taken out and it was allowed to dry in the open air for two days.

The dry semi-finished product 8 was placed in a muffle in the open air and the following cycle was set:

- from room temperature up to 150° C. in 1 hour;
- stasis at 150° C. for 1 h;
- rise to 400° C. in 1 day;
- rise to 450° C. in 1 hour;
- stasis to 450° C. for 2 hours;
- rise to 1600° C. in 12 hours;
- stasis to 1600° C. for 2 hours;
- cooling in muffle.

EXAMPLE 5

To make a component which, as in the example 4, has an outer part obtained with a sinterable powder material and an external part obtained with a different sinterable powder material, the variation shown schematically in FIG. 12 has been presented.

Without going into detail as regards the ingredients used, it is underlined that the mixing phase consisted in forming a first mix 4a and a second mix 4b of substantially different composition.

The first mix 4a was first of all shaped with the shape impressed by the forming mould 6 of FIG. 3 but did not undergo the excess water/hydrocolloid mix 2a removal process, so as to obtain a substantially rigid element 19, e.g., with cylindrical shape.

Afterwards, the substantially fluid second mix 4b was applied, e.g., by spray means, on the substantially rigid element 19 to obtain a covered element.

The covered element thus obtained was then inserted in the forming mould 6 and underwent the complete cycle of removing the excess water/hydrocolloid mix 2a, of wiping and of drying until the sintered product 5 was obtained which, as required, presented an internal part made with a sinterable material and an outer surface part made with a different sinterable material.

* * *

It was in fact ascertained how the described invention achieves the set objects.

In particular, the fact is underlined that the process according to the invention allows using inexpensive and non-toxic compounds to obtain a mix which, by virtue of the high water content, has great fluidity and is able to flow with great ease inside the forming mould.

Thanks to the filtering means inside the forming mould, furthermore, the semi-finished product coming out of the mould has a rather low water content, which gives it a high tensile strength.

The phase of detachment and extraction of the semi-finished product from the mould is therefore rather simple and quick, as are all the subsequent handling operations.

A non-excessive water content in the just-formed semi-finished product, furthermore, allows using a fairly simple drying cycle, with the possibility of also fabricating metal or ceramic objects with considerable wall thickness.

Finally, it is underlined that the drying cycle in agreement with the present invention is such as not to produce the formation of bubbles and/or internal defects and allows obtaining a semi-finished product ready for sintering with very high strength, further ensuring that the piece will maintain the acquired geometric shape.

The invention claimed is:

1. A process for the manufacture of sintered products, comprising the steps of:
    mixing at least a sinterable powder material, a liquid carrier and a gelling agent to form a mix, said gelling agent having a gelling temperature below which said mix is rigid and a sol temperature above which said mix is fluid;
    introducing said mix into a forming mould having a filter having openings smaller than 50 μm, the filter being suitable for being crossed by said liquid carrier and trapping the at least a sinterable powder material;
    heating the forming mould at a temperature higher than said gelling temperature;
    applying a pressure greater than 2 MPa in said forming mould, heated, with said mix which has at least a temperature higher than said gelling temperature and is fluid, said step of applying the pressure being suitable for allowing said liquid carrier to come out at least partially from said forming mould through said filter;
    lowering the temperature of said mix in said forming mould below said gelling temperature to obtain a rigid semi-finished product; and
    sintering said rigid semi-finished product to obtain said sintered product.

2. The process according to the claim 1, further comprising drying said semi-finished product before said sintering.

3. The process according to claim 2, wherein said drying step comprises leaving said semi-finished product in the open air, the drying occurring by natural evaporation.

4. The process according to claim 2, wherein said drying step comprises placing said semi-finished product into a controlled evaporation system.

5. The process according to claim 1, wherein said gelling agent mixed with said liquid carrier forms a gel with a resistance at least equal to 200 g/cm.

6. The process according to claim 1, wherein said mixing step comprises mixing at least one additional component selected from the group consisting of hardeners, fluidizers, surfactants, corrosion inhibitors, fungicides, bactericides, and spacers.

7. The process according to claim 1, wherein the at least a sinterable powder material is metallic, ceramic, or a mix of these two.

8. The process according to claim 1, wherein said liquid carrier is selected from the group consisting of water, alcohol, organic solvents, and a mix of any one of these substances.

9. The process according to claim 1, wherein said gelling agent is selected from the group consisting of agar-agar, carrageenan, pectin, animal gelatines, isinglass, alginates, agarose, xanthan gum, caribe seed flour, acacia, and cellulose gum.

10. The process according to claim 1, wherein, during said introducing step, the temperature of said mix is higher than said gelling temperature with said fluid mix.

11. The process according to claim 1, wherein, during said introducing step, the temperature of said mix is below said sol temperature with said rigid mix.

12. The process according to the claim 11, wherein, during said introducing step, said rigid mix is shaped in a form selected from the list comprising: pellets, cubes, discs, rings, sheets.

13. The process according to claim 1, wherein said filter comprises at least a slot obtained in said forming mould and with dimensions lower than the average dimensions of the particles of said sinterable powder material.

14. The process according to claim 1, wherein said filter comprises at least an insert in porous material arranged inside said forming mould.

15. The process according to claim 1, wherein said step of lowering the temperature of said mix comprises cooling said forming mould.

16. The process according to claim 1, wherein said step of lowering the temperature of said mix comprises freezing said mix.

17. The process according to claim 1, wherein said mixing step comprises forming at least a first mix and at least a second mix of different composition and shaping said first mix and said second mix independently to obtain rigid mixes, said introducing step comprising distributing said rigid mixes in preset spatial sequences inside said forming mould.

18. The process according to claim 1, wherein said mixing step comprises forming at least a first mix and at least a second mix of different composition, shaping the at least first mix to obtain a rigid element and applying said second fluid mix on said rigid element to obtain a coated element, said introducing step comprising the insertion of said coated element into said forming mould.

19. The process according to the claim 18, wherein said step of applying the at least a second mix is by spraying.

20. A process for the manufacture of sintered products, comprising the steps of:

mixing 80-90 wt % of a sinterable powder material, 10-20 wt % of a liquid carrier and 0.1-0.6 wt % a gelling agent to form a mix, said gelling agent having a gelling temperature below which said mix is a rigid gel with a strength of at least 200 g/cm$^2$ and a sol temperature above which said mix is fluid;

introducing said mix into a forming mould having a filter having openings smaller than 50 μm, the filter being suitable for being crossed by said liquid carrier and trapping said sinterable powder material;

heating the forming mould at a temperature higher than said gelling temperature;

applying a pressure greater than 2 MPa in said forming mould, heated, with said mix which has at least a temperature higher than said gelling temperature and is fluid, said step of applying the pressure being suitable for allowing said liquid carrier to come out at least partially from said forming mould through said filter;

lowering the temperature of said mix in said forming mould below said gelling temperature to obtain a rigid semi-finished product; and sintering said rigid semi-finished product to obtain said sintered product.

* * * * *